United States Patent [19]

Nakazawa et al.

[11] Patent Number: 5,772,168
[45] Date of Patent: Jun. 30, 1998

[54] MOUNTING BRACKET FOR PRESSURIZED FLUID BUFFER DEVICE

[75] Inventors: Chiharu Nakazawa, Kawasaki; Susumu Shinozaki, Sagamihara; Michiya Hiramoto, Yokohama; Hiroshi Hoya, Kawasaki; Kohtaro Shiino, Odawara, all of Japan

[73] Assignee: Unisia Jecs Corporation, Atsugi, Japan

[21] Appl. No.: 563,046

[22] Filed: Nov. 27, 1995

[30] Foreign Application Priority Data

| Nov. 28, 1994 | [JP] | Japan | 6-292637 |
| May 17, 1995 | [JP] | Japan | 7-118573 |
| Sep. 26, 1995 | [JP] | Japan | 7-270634 |
| Sep. 26, 1995 | [JP] | Japan | 7-270635 |

[51] Int. Cl.$^6$ .................................................. A47F 5/00
[52] U.S. Cl. ........................ 248/300; 248/631; 280/673; 280/668
[58] Field of Search ................... 280/668, 96.1, 280/660, 673, 702, 709, 710; 248/300, 631, 560, 65, 74.2, 230.2, 278.2, 279.11

[56] References Cited

U.S. PATENT DOCUMENTS 5,074,579 12/1991 Evangelisti ........................ 280/673 X
5,454,585 10/1995 Dronen et al. ........................ 280/660

FOREIGN PATENT DOCUMENTS

| 1 579 930 | 11/1980 | European Pat. Off. . |
| 3105170C2 | 2/1982 | Germany . |
| 1-120404 | 8/1989 | Japan . |
| 2 187 532 | 9/1987 | United Kingdom . |

*Primary Examiner*—Ramon O. Ramirez
*Attorney, Agent, or Firm*—Foley & Lardner

[57] ABSTRACT

A fixing bracket for a pressurized fluid buffer device such as a shock absorber or the like is formed as a single piece U-shaped bracket having a circular body portion for surrounding an outer cylinder of the shock absorber and opposed mounting flange portions for attachment to a vehicular chassis. At a location axially outward of the location of bolt holes for attaching the fixing bracket, opposes pairs of projected tooth portions are provided oriented toward each other to contact an exposed portion of the outer cylinder. According to this structure, during vehicle bouncing, for examples the tooth portions are urged to wedge, or bite into the outer cylinder for counteracting forces in a separation direction of the flange portions. Thus, strength is improved while installation processing is reduced. Further, according to this arrangement both manufacturing and installation costs may be significantly reduced while structural features and design flexibility are improved.

11 Claims, 11 Drawing Sheets

MOUNTING BRACKET FOR PRESSURIZED FLUID BUFFER DEVICE

FIELD OF THE INVENTION

The present invention relates to a mounting bracket for a pressurized fluid buffer device. Specifically, the invention relates to a fixing bracket for a pressurized fluid buffer device, which may include such devices as hydraulic shock absorbers for an automotive vehicle, or the like.

DESCRIPTION OF THE RELATED ART

In so-called thrust type suspensions, a piston rod for a pressurized fluid buffer device is generally mounted on a vehicle body and piston load is received by an outer cylinder portion of the buffer device retained by a fixing bracket, which may be attached to a knuckle spindle or an axle housing of a vehicle chassis. Consequently, considerable piston load force is also applied to such a fixing bracket.

Generally, a fixing bracket is utilized for retaining pressurized fluid buffer devices such as automotive shock absorbers. One such conventional mounting bracket is described in Japanese Patent Application First Publication 1-120404, which will be described herein below.

The above-mentioned prior art discloses a fixing bracket having a circular body portion having a longitudinal cut-out portion exposing a portion of a circular outer circumference of an outer cylinder portion of a vehicular shock absorber. Such a fixing bracket is disposed around a lower side of the outer cylinder of the shock absorber. According to the disclosed structure, vertically extending installation flanges are provided on either side of the cut-out portion of the fixing bracket and rib portions are provided proximate where the installation flanges are extended from the circular body portion. The rib portions are inserted into concave portions provided in the outer cylinder of the shock absorber for positionally fixing the shock absorber.

However, according to the above structure, when left and right spring mounted type shock absorbers are installed at a given angle on a vehicle body via such fixing brackets, according to tightening of a bolt, or bolts retaining the fixing brackets to the vehicle body, a spring axis of the spring may be urged eccentrically to the axis of the shock absorber. According to such a condition, when the vehicle body is subject to bouncing during operation, a so-called bending moment is produced at left and right sides of the vehicle. Such a condition may lead to a situation where the concave portions of the outer cylinder of the shock absorber applies pressure against the engaged rib portions of the fixing bracket so as to enlarge a width of the cut-out portion, urging the installation flanges away from each other. Gradually, support of the shock absorber may be weakened, particularly at an upper side of the fixing bracket. If such a fixing bracket is of a type in which a single axis is utilized for forming opposing bolt holes on each flange, the installation flanges may not achieve a firm 'bite' on the outer cylinder and lead to a situation that may compromise cornering stability and overall handling of the vehicle.

Thus it has been required to provide a fixing bracket for a pressurized fluid buffer device that offers sufficient rigidity and strength for resisting forces applied during bending, or inertial moments of the buffer device at both left and right sides of the vehicle. Preferably, a fixing bracket is desirable, which may offer the above characteristics in a light weight low cost and substantially simple structure.

SUMMARY OF THE INVENTION

Thus, it is an object of the present invention to overcome the drawbacks of the related art.

It is a further object of the invention to provide a fixing bracket for a pressurized fluid buffer device that offers sufficient rigidity and strength for resisting forces applied during bending, or inertial moments of the buffer device at both left and right sides of the vehicle.

It is also an object of the invention to provide a fixing bracket having the above characteristics, which bracket is light in weight, low in cost and substantially simple in structure.

According to one aspect of the present invention, a mounting structure for a hydraulic shock absorber for an automotive vehicle includes a hydraulic shock absorber and a fixing bracket. The shock absorber has an outer cylinder with a lower portion on the peripheral surface thereof. The fixing bracket comprises a body portion partially surrounding the lower portion on the peripheral surface of the outer cylinder except the longitudinal surface portion extending in the longitudinal direction of the hydraulic shock absorber. The body portion has opposed edges defining a gap extending in the longitudinal direction of the hydraulic damper. The longitudinal surface portion is exposed at the gap.

The fixing bracket further has a pair of opposed flange portions respectively extending from the opposed edges defining the gap and formed integrally with the body portion. Each of the pair of opposed flange portions is formed with upper and lower bolt holes, which are separated by a first distance in the longitudinal direction of the hydraulic damper.

The fixing bracket further has tooth portions on the pair of opposed flange portions. The tooth portions project toward each other, inwardly across the gap and have contact surfaces that contact the exposed longitudinal surface portion. The tooth portions become firmly engaged with the exposed longitudinal surface portion when a bending moment, which tend to widen the gap, occurs between the outer cylinder and the fixing bracket.

Another aspect of the present invention is the afore-described fixing bracket for mounting the afore-described hydraulic shock absorber.

DESCRIPTION OF THE PREFERRED EMBODIMENT

Figure 1:
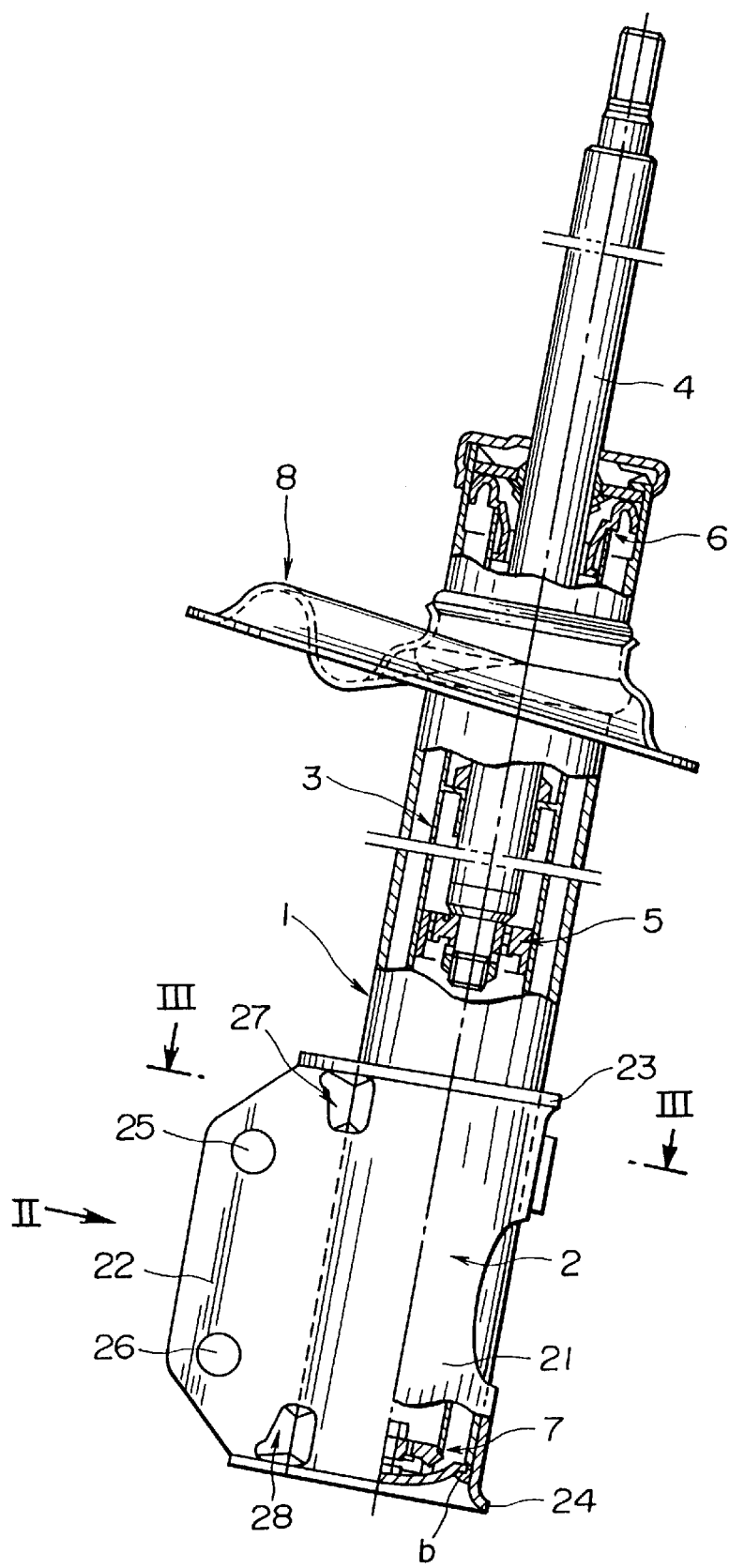
FIG. 1 is a partially cut-away side view of a shock absorber mounted on an automotive vehicle utilizing a fixing bracket according to a first embodiment of the invention.
Figure 2:
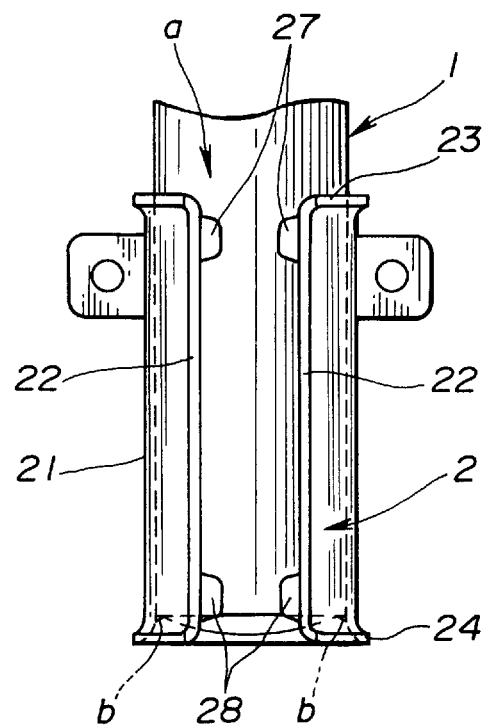
FIG. 2 is a side view of the fixing bracket of the first embodiment, disposed around an outer side of the shock absorber, as viewed in the direction of the arrow II of FIG. 1.
Figure 3:
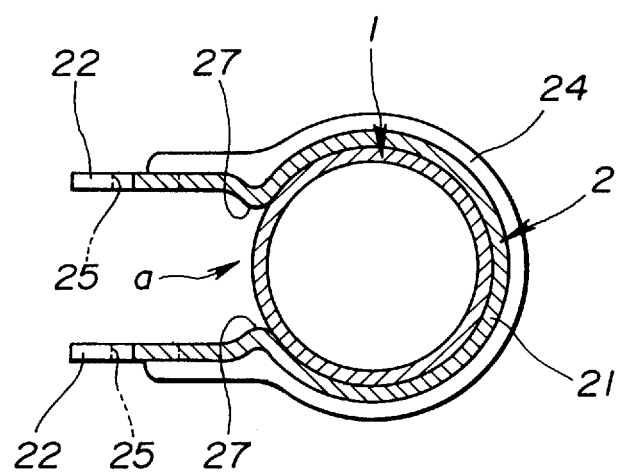
FIG. 3 is a cross-sectional view taken along line III—III of FIG. 1, showing the fixing bracket of the first embodiment disposed around a vehicular shock absorber.

Hereinbelow, a preferred embodiment of the invention will be explained in detail with reference to the drawings. Referring to FIGS. 1–3, wherein FIG. 1 is a partially cut-away side view of a shock absorber mounted on an automotive vehicle utilizing a fixing bracket according to the first preferred embodiment while FIG. 2 shows a side view of the fixing bracket of the first embodiment, disposed around all outer casing of the shock absorber, as viewed in the direction of the arrow II of FIG. 1. FIG. 3 is along line III—III of FIG. 1, and shows a cross-sectional view of the fixing bracket of the invention.

As may be appreciated from the drawings, an outer cylinder 1 of a pressurized fluid buffer device, such as a vehicular shock absorber is partially encircled by a fixing bracket 2 according to the invention. The shock absorber generally includes a cylinder 3, a piston rod 4 attached to a piston 5, and a piston rod guide portion 6. A base valve is disposed at a lower side of the shock absorber and a spring sheet 8 is provided at an upper side disposed around the outer cylinder 1 just below the piston rod guide 6.

As seen in the drawings, the fixing bracket 2 is disposed around the lower end of the outer cylinder 1 of the shock absorber, the fixing bracket 2 has a circular body portion 21 determined according to the outer circumferential dimension of the outer cylinder 1 of the shock absorber. Referring to FIGS. 2, 3 it may be seen that a longitudinal surface portion a of the outer cylinder is exposed according to installation of the circular body portion 21 of fixing bracket 2 thereon. According to the installed position of the fixing bracket 2, the exposed surface portion a is defined between two opposing, vertically extending flange portions 22, 22 integrally formed with the circular body portion 21. It will further be noted that at upper and lower sides of the fixing bracket 2, upper and lower lip portions 23 and 24, which partially extend along the upper and lower edges of the flange portions 22, 22, are defined by bending processing or the like, integrally formed with the circular body portion 21 and the flange portions 22, 22 as part of the structure of the fixing bracket according to the present embodiment.

Further, as best seen in FIG. 1, each of the flange portions 22, 22 include an upper bolt hole 25 and a lower bolt hole 26 for installation purposes, Also, at positions inward of the upper and lower bolt holes 25, 26 proximate a position where the flange portions 22, 22 extend from the circular body portion 21, upper and lower projected tooth portions 27, 27, 28, 28 are defined by punch processing or the like. As seen in FIG. 1, according to the present embodiment, the upper projected tooth portions 27, 27 are formed on the flange portions 22, 22 at a position upward of an axial center of the upper bolt holes 25, 25 while the lower projected tooth portions 28, 28 are formed on the flange portions 22, 22 at a position downward of an axial center of the lower bolt holes 26, 26.

Further, as may be seen in FIGS. 1 and 2, a lower side of the outer cylinder 1 of the shock absorber is formed to be slightly convex. Accordingly, between a lower side of the outer cylinder 1 and a lower side of the circular body portion 21 of the fixing bracket 2 an annular space is defined. According to the present embodiment, an annular weld b is formed in this space for effecting attachment between the outer cylinder 1 of the shock absorber and the inner side of the circular body portion 21 of the fixing bracket 2.

Herein below, the functional advantages of the fixing bracket structure according to the invention as set forth above, will be described in detail.

Referring to FIG. 1, since the bolt attachment (i.e. bolt holes 25, 25, 26, 26) of the fixing bracket 2 against which a lower side of the pressurized fluid buffer device is supported is formed eccentric to and outside of a center axis of the pressurized fluid buffer device, when the outer cylinder 1 of such a buffer device is mounted at left or right sides of a vehicle via such a fixing bracket, the projected tooth portions 27, 27, 28, 28, are firmly wedged against the surface of the outer cylinder 1 during a bending moment caused by vehicle bouncing. As may be appreciated from FIG. 1, when the buffer device is mounted at an angular position, due to the positional relationship between the projected tooth portions 27, 28 and the bolt holes 25, 26, when the vehicle is subject to bouncing and the opposed installation flanges 22, 22 of the fixing bracket are subjected to force in a separation direction, the projected tooth portions are situated so as to bite in, or become wedged, between the circular body portion 21 and the outer cylinder 1 of the pressurized fluid buffer device in such a way as to resist such separation force. According to the present structure, this effect is particularly evident at an upper side of the fixing bracket so as to counteract the relatively higher separation forces applied there.

Thus, improved rigidity and mechanical strength are provided over the conventional structure while a substantially simple, lightweight structure is employed.

Further, according to the structure of the invention, it is not necessary to provide any engagement members, recesses or the like on the actual outer cylinder of the buffer device, thus overall installation and manufacturing is simplified and costs ate reduced.

Further, according to the invention, sufficient rigidity and mechanical strength for support of such a pressurized fluid buffer device may be achieved even if a reduced thickness of a material forming the outer cylinder 1 of the buffer device is utilized. Further, a thickness of the material forming the circular body 21 or the Installation flanges 22, 22 of the fixing bracket 2 may be reduced while still obtaining sufficient strength and support.

Also, sufficient rigidity and mechanical strength for support of such a pressurized fluid buffer device at both sides of the vehicle is assured according to the structure of the invention even if a common axis is respectively used for both upper and both lower bolt holes 25, 25, 26, 26. According to bolting of the fixing bracket via the bolt holes 25, 26 at a lower side of a spring of the buffer device, sufficient support and strength may be reliably obtained.

Next, referring to FIGS. 4–6 a second embodiment of a fixing bracket according to the invention will be described in detail herein below. Where possible reference numerals as in the above-described first embodiment will be used to denote like parts according to the second embodiment as described herein below in detail.

Figure 4:
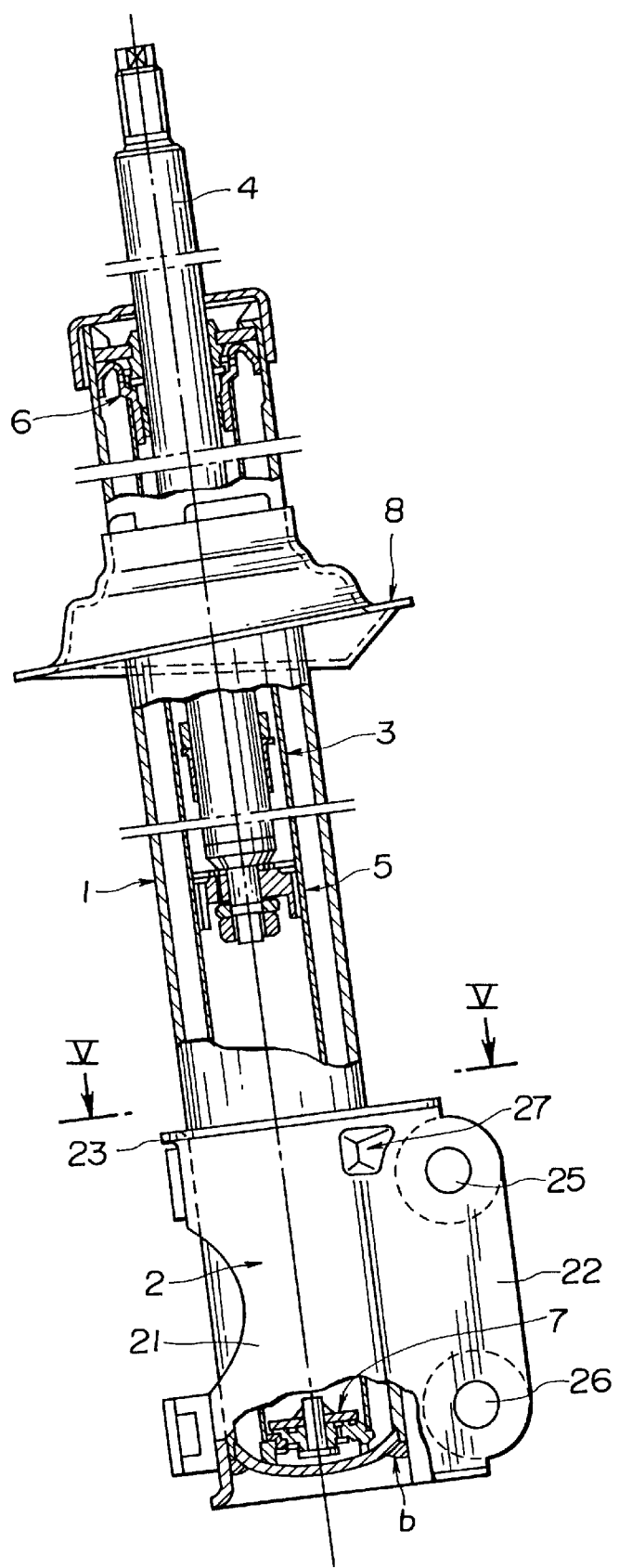
FIG. 4 is a partially cut-away side view of a shock absorber mounted on an automotive vehicle utilizing a fixing bracket according to a second embodiment of the invention.
Figure 5:
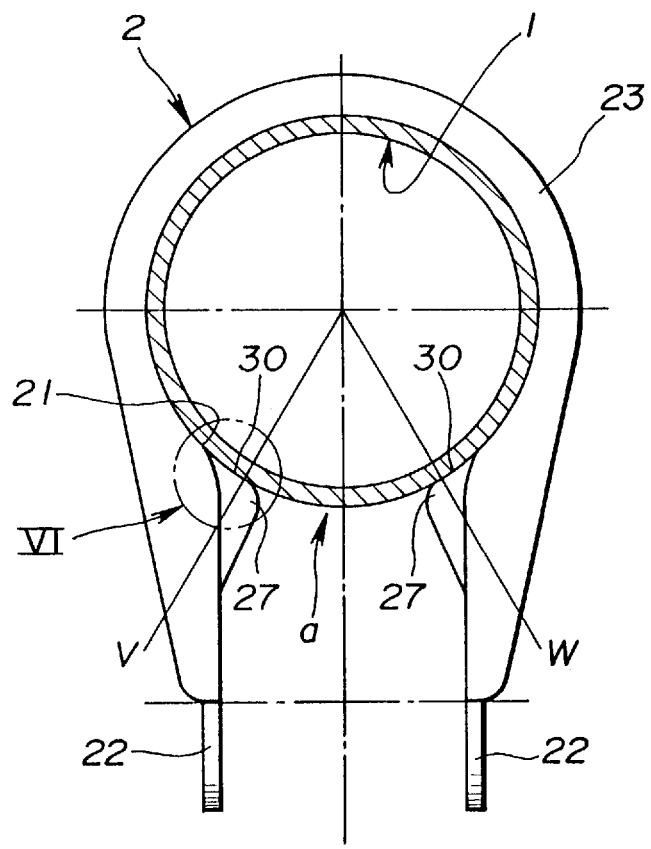
FIG. 5 is a cross-sectional view taken along line V—V of FIG. 4, showing the fixing bracket of the second embodiment disposed around an outer casing of a vehicular shock absorber.
Figure 6:
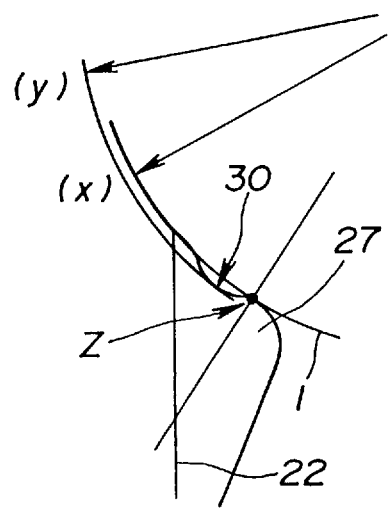
FIG. 6 is an enlarged view of the encircled portion VI of FIG. 5.

As may be seen in FIGS. 4–6, the fixing bracket 2 according to the second preferred embodiment includes a circular body portion 21 having a pair of opposed projecting installation flanges 22, 22. FIG. 4 shows the fixing bracket 2 in an installed condition relative to an automotive pressurized fluid buffer device including an outer cylinder 1. As may be seen from FIGS. 5 and 6, which respectively represent cross-sectional and enlarged cross-sectional views taken along line V—V of FIG. 4, it may be seen that upper and lower lip portions 23 and 24 are formed by bending processing, for example. Referring to FIG. 5, it will be noted that the lip portions 23, 24 of the present embodiment extend along upper and lower edges of the installation flanges 22, 22 to a greater degree than in the above described first embodiment, This adds even greater rigidity to the extending flange portions 22, 22.

As with the previous embodiment, a longitudinal surface portion a of the outer cylinder 1 is exposed according to installation of the circular body portion 21 therearound.

Referring to FIG. 4, each of the flange potions 22, 22 includes an upper bolt hole 25 and a lower bolt hole 26 for installation purposes. Positioned inwardly of the upper bolt hole 25, proximate the base line of the flanges (i.e. where the flange portions 22, 22 extend from the circular body portion 21), upper projected tooth portions 27, 27, are defined by punch processing or the like.

As with the first embodiment, lower side of the outer cylinder 1 of the shock absorber may be formed slightly convex and retained via an annular weld b disposed at an inner side of the circular body portion 21 of the fixing bracket 2. However, the present invention is not limited to this form of attachment between the bracket 2 and outer cylinder 1 and various alternative means may also be employed.

Bolt attachment is made via the upper and lower bolt holes 25, 25, 26, 26 which are eccentric to and outside of a center axis of the pressurized fluid buffer device, According to the present embodiment, when the outer cylinder 1 of such a buffer device is mounted at left or right sides of the vehicle (not shown) by the fixing bracket 2, the upper projected tooth portions 27, 27, are firmly wedged against the surface of the outer cylinder 1 during a bending moment caused by vehicle bouncing. The positional relationship between the upper projected tooth portions 27, and the upper bolt holes 25, when the vehicle is subject to bouncing the projected tooth portions bite in, or become wedged, between the circular body portion 21 and the outer cylinder 1 of the pressurized fluid buffer device in such a way as to resist forces in a separation direction of the flange portions 22,22. According to the present embodiment, wherein lip portions 23, 24 are formed to reinforce the rigidity of the flange portions, such wedging effect is concentrated at an upper side of the fixing bracket 2 so as to counteract the high separation forces applied there.

For enhancing the advantageous characteristics of the simplified structure of the second embodiment, the projected tooth portions 27, 27 according to the present embodiment include various unique structural features.

Referring to FIG. 6, x refers to an inner circumference of the circular body portion 21, substantially corresponding to an outer dimension of the outer cylinder 1. y refers to outer circumferential surface of the circular body portion 21, determined according to thickness of material employed for forming the fixing bracket 2; and z refers to the contact point of each tooth portion 27, as will be explained in detail herein below.

As best seen in FIG. 6, which is an enlarged view of the area shown in a circular area VI of FIG. 5, the projected tooth portions according to the present embodiment include a groove 30 along a contact surface of each projected tooth portion 27 such that a distal end, or contact point z of each tooth portion 27 is separated from the inner circumferential area x, of contact between the inner surface of the circular body portion 21 and the outer cylinder 1, to contact the exposed surface a of the outer cylinder 1 at positions toward each other from the base line of the flange portions by a given dimension α of the groove 30.

This structure promotes an increased 'wedging in' effect of the tooth portions when the flange portions are subject to stress or force in separations directions thereof, such as occur during vehicle bouncing. The above configuration of the projected toothed portions achieve a higher contact pressure against the surface a of the outer cylinder 1 for promoting the 'biting in' or 'wedging' effect of the bracket of the invention.

According to such alternative configuration of the tooth portions as shown by the second embodiment, only one opposed pair of tooth portions 27, 27 may be provided only at the upper side of the fixing bracket 2 or both upper and lower pairs of the opposed projected tooth portions 27, 27 and 28, 28 may alternatively provided in a configuration resembling the above described first embodiment.

However, according to the simplified structure of the second embodiment as disclosed above, sufficient rigidity and mechanical strength over conventional structures are obtained while a substantially simple, lightweight structure is employed. Again, the above advantages are obtained even if a reduced thickness of material is utilized for forming the outer cylinder 1, the circular body 21 and/or the installation flanges 22, or if one or both pairs of upper and lower bolt holes 25, 25, 26, 26 are respectively formed with a common axis.

Further, according to the structure according to the second embodiment, it is not necessary to provide any engagement members, recesses or the like on the actual outer cylinder of the buffer device, thus reducing cost. Also, since the fixing bracket of the invention may be fabricated as a single piece, cost reduction is further promoted.

Referring now to FIGS. 7–11 a third embodiment of a filing bracket according to the invention will be described in detail. According to the third embodiment, a fixing bracket according to the invention is implemented for so-called thrust type vehicle suspensions and is adapted for being mounted at front, rear, left or right sides of a vehicle for positionally fixing a pressurized fluid buffer device with the same advantages as obtained according to the above-described first and second embodiments.

Figure 7:
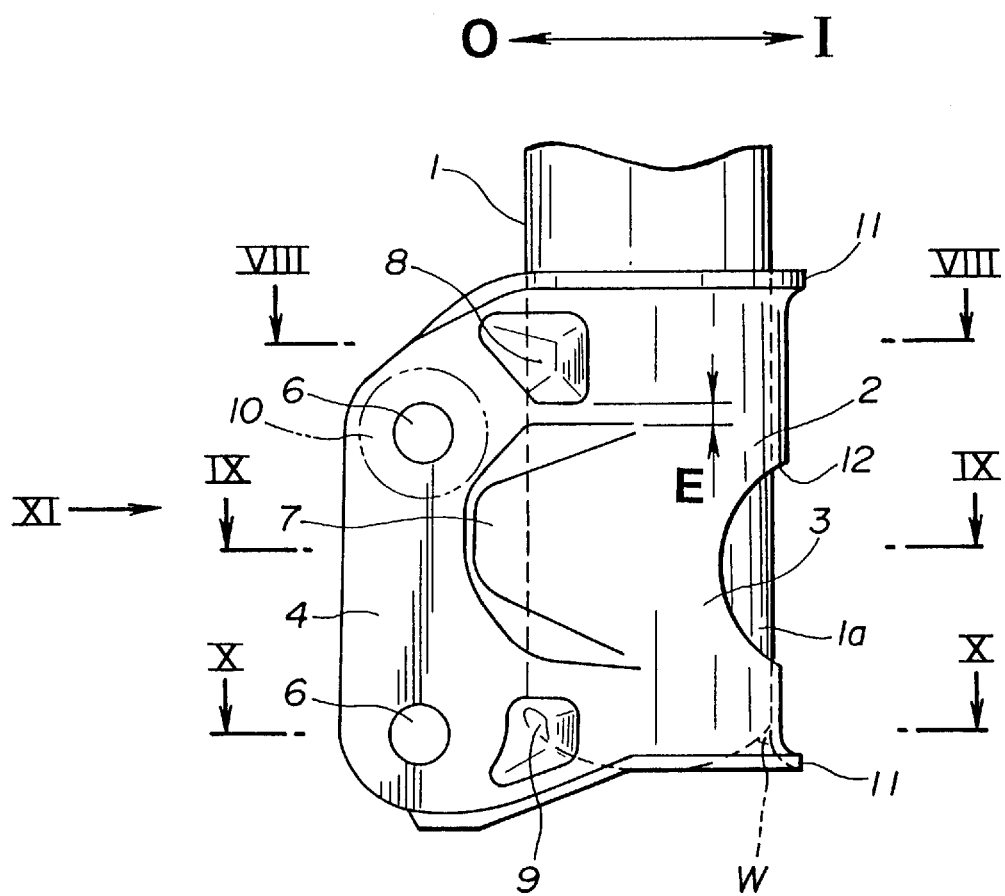
FIG. 7 is a side view of a fixing bracket according to a third preferred embodiment of the invention.
Figure 8:
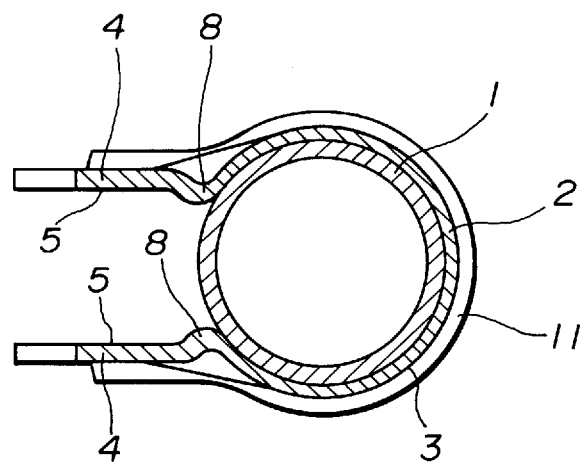
FIG. 8 is a cross-sectional view of the bracket of the third embodiment, taken along line VIII—VIII of FIG. 7.
Figure 9:
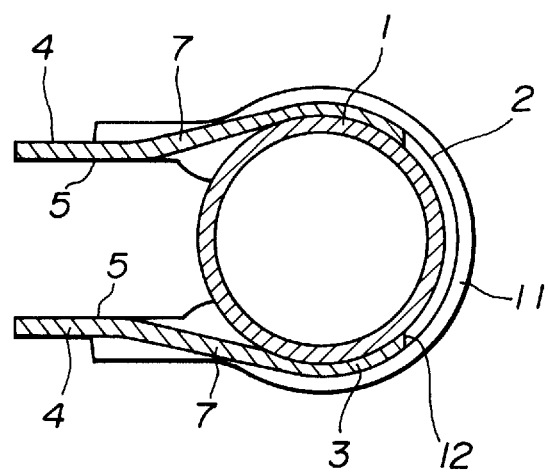
FIG. 9 is another cross-sectional view of the bracket of the third embodiment, taken along line B—B of FIG. 7.
Figure 10:
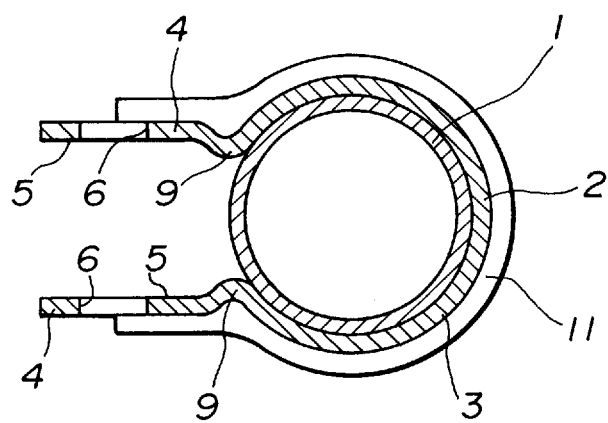
FIG. 10 is a third cross-sectional view of the bracket of the third embodiment, taken along line X—X of FIG. 7.

Referring to FIG. 7, the fixing bracket 2 according to the present embodiment is formed as a single piece U-shaped bracket 2 including a circular body portion 3 having a pair of opposed projecting installation flanges 4, 4. FIG. 7 shows the fixing bracket in an installed condition relative to an automotive pressurized fluid buffer device including an outer cylinder 1. FIGS. 8–10, respectively represent cross-sectional views taken along lines VIII—VIII, IX—IX and X—X of FIG. 7. The fixing bracket 2 is installed such that the flange portions 4, 4 project substantially perpendicular to the rotational plane of a vehicle road wheel (not shown) and the letters O and I at upper left and right sides of FIG. 7 indicate a direction towards outer O and inner I sides of the vehicle wheel in relation to, for example, an annular central area of the vehicle wheel or of a tread portion of an automotive tire.

It may be seen in FIG. 7 that upper and lower lip portions 11, 11 are formed by bending processing, for example, and extend along upper and lower edges of the circular body portion 3 as well as extending along upper and lower edges of the opposed flange portions 4, 4 to point approximately corresponding to an axial center of respective upper and lower bolt holes 6, 6 to promote greater rigidity of the flange portions 4, 4. Further, a cut-out 12 is provided through a central area of the circular body portion 3 at a location which is substantially diametrically opposed to projecting directions of the flange portions 4, 4, exposing a second surface portion 1a of the outer cylinder 1.

The longitudinal surface portion a of the outer cylinder 1 between the flange portions and, positioned inwardly of the upper bolt hole 6, proximate the base line of the flanges upper projected tooth portions 8, 8, are defined by punch processing while inwardly of the lower bolt holes 6, 6 at the base line of the flange portions 4, 4, lower projected tooth portions 9, 9, are defined.

The lower convex side of the outer cylinder 1 of the shock absorber is retained via an annular weld W at a lower side of the circular body portion 3 of the fixing bracket 2. However, alternative means of attachment may also be employed.

Bolt attachment is made via the upper and lower bolt holes 6, 6, which are eccentric to an outside of a center axis of the pressurized fluid buffer device. According to the present embodiment, the fixing bracket 2 may be utilized to mount the outer cylinder of a pressurized fluid device, such as a vehicle shock absorber at front or rear ends at left or right sides of a vehicle (not shown).

Referring now to FIG. 8, it may be seen that the upper projected tooth portions 8 are firmly wedged against the surface of the outer cylinder 1 during a bending moment caused by vehicle bouncing, and are structurally similar to the projected tooth portions of the first embodiment. According to the positional relationship between the upper projected tooth portions 8 and the upper bolt holes 6, when the vehicle is subject to bouncing, the projected tooth portions bite in between the circular body portion 3 and the outer cylinder 1 of the pressurized fluid buffer device in such a way as to resist forces in a separation direction of the flange portions 4. As noted above, the lip portions 11, 11 of the present embodiment reinforce the rigidity of the flange portions 4.

Enhancing the advantageous characteristics of the simplified structure of the third embodiment, the fixing bracket of the present embodiment includes opposed central wedge members 7, 7 formed by bending at an area astride the so-called base line of the flange portions 4, 4, from the circular body portion 3 to the central area of the flange portions 4, 4. Referring now to FIG. 9, a cross-sectional view along line IX—IX of FIG. 7 shows the structure of the central wedge members 7. FIG. 7 shows that, according to the third embodiment, each central wedge member 7 is situated closer to the upper bolt hole 6 than the lower bolt hole 6.

As may be appreciated from FIG. 9, the wedge members 7 promote increased 'wedging in' effect of the tooth portions 8, 9 and the central wedge portion 7 when the fixing bracket 2 is subject to stress. Additionally, the above configuration achieves high contact pressure against the surface portion a of the outer cylinder 1.

According to the simplified structure of the third embodiment as disclosed above, sufficient rigidity and mechanical strength over conventional structures are obtained while a substantially simple, lightweight structure is employed. Again, the above advantages are obtained even if a reduced thickness of material is utilized for forming the outer cylinder 1, the circular body 3 and/or the installation flanges 4, or if one or both pairs of upper and lower bolt holes 6 are respectively formed with a common axis.

Referring now to FIG. 10, it may be seen that the lower projected tooth portions 9 are configured to be wedged against the surface of the outer cylinder 1 during a bending moment caused by vehicle bouncing, and are structurally similar to the upper projected tooth portions 8. According to the positional relationship between the lower projected tooth portions 9 and the lower bolt holes 6, when the vehicle is subject to bouncing, the projected tooth portions bite in between the circular body portion 3 aid the outer cylinder 1 of the pressurized fluid buffer device in such a way as to resist forces in a separation direction of the flange portions 4. As noted above, the lip portions 11, 11 of the present embodiment reinforce the rigidity of the flange portions 4.

According to the above-described structure fixing stability is raised and thus preserves cornering stability improving overall vehicle handling. Further, the present structure may be utilized to mounting any of front, rear, left or right pressurized fluid buffer devices.

Referring now to FIGS. 12–14 and 15–18, fourth and fifth embodiments of a fixing bracket according to the invention will be described in detail. The fourth and fifth embodiments of a fixing bracket 2 according to the invention is also implemented for so-called thrust type vehicle suspensions and is adapted for mounting at front, rear, left or right sides of a vehicle for positionally fixing a pressurized fluid buffer device such as a vehicular shock absorber with the same advantages as obtained according to the above-described embodiments.

Figure 12:
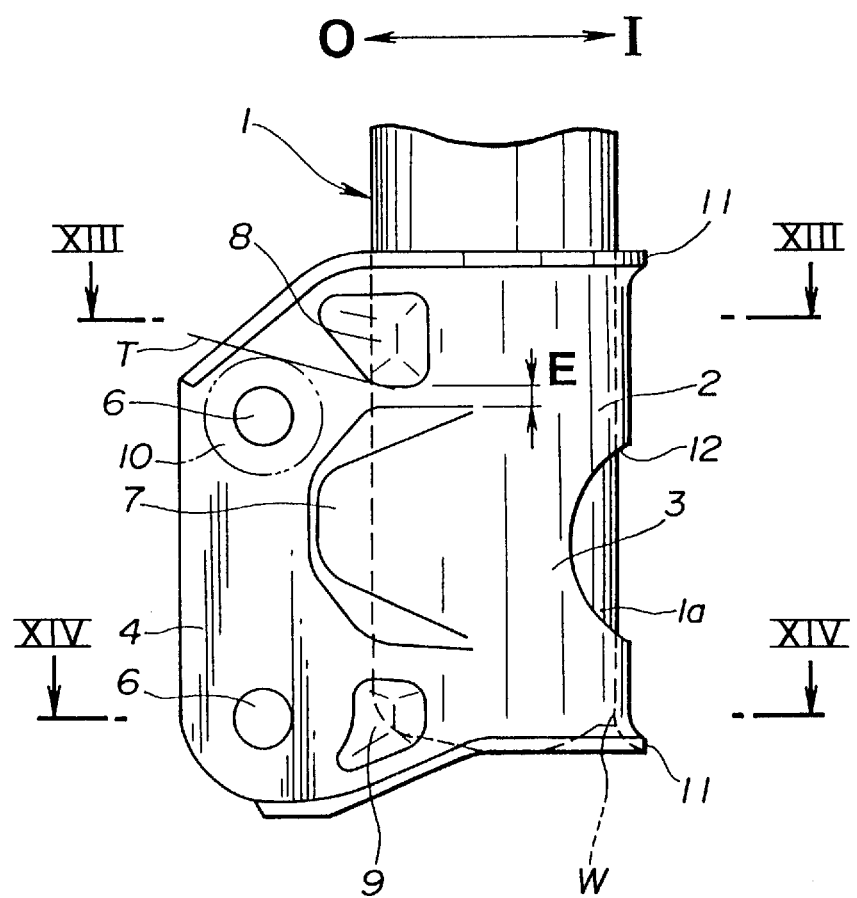
FIG. 12 is a side view of a fixing bracket according to a fourth preferred embodiment of the invention.
Figure 13:
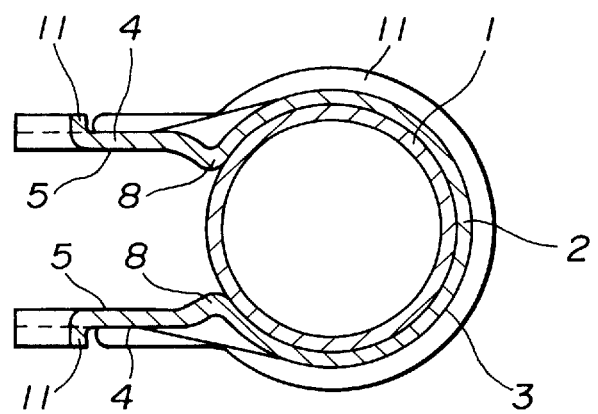
FIG. 13 is a cross-sectional view of the bracket of the fourth embodiment, taken along line XIII—XIII of FIG. 12.
Figure 14:
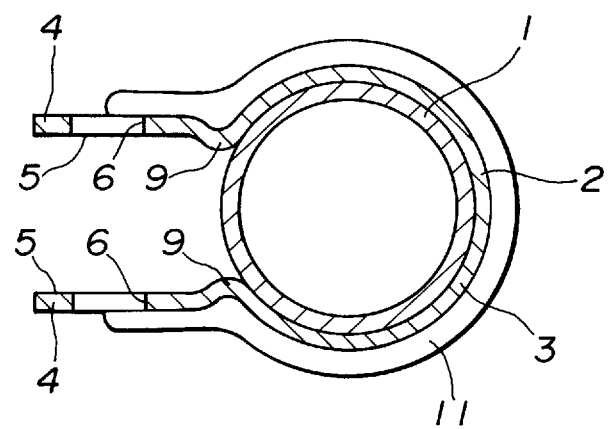
FIG. 14 is a cross-sectional view of the bracket of the embodiment, taken along line XIV—XIV of FIG. 12.
Figure 15:
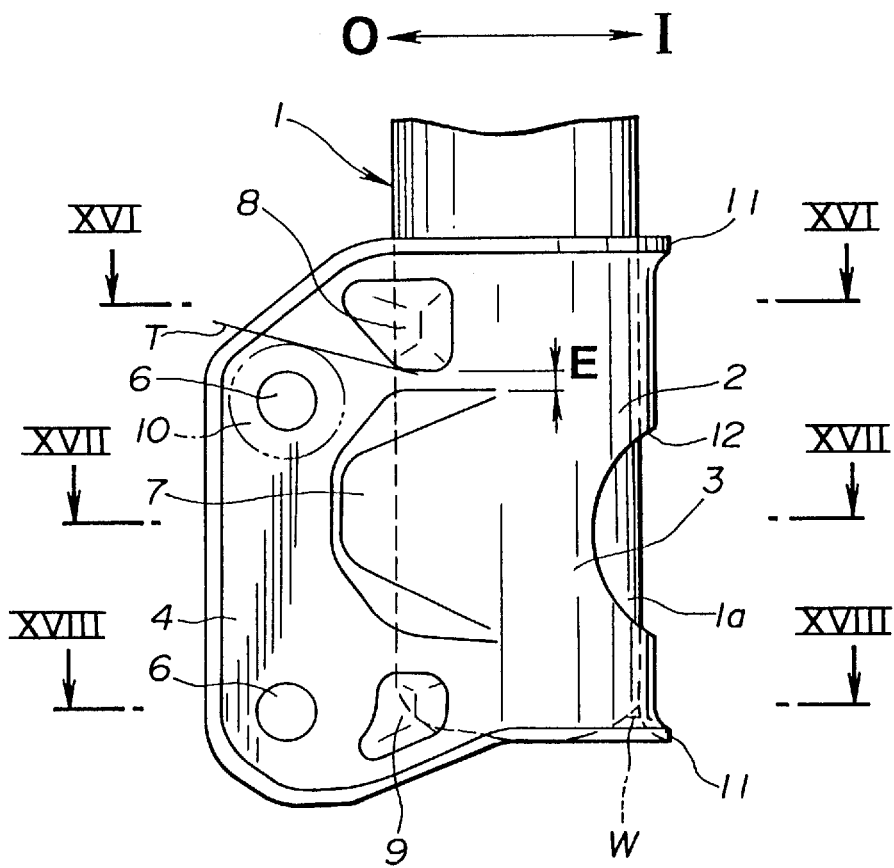
FIG. 15 is a side view of a fixing bracket according to a fifth preferred embodiment of the invention.
Figure 16:
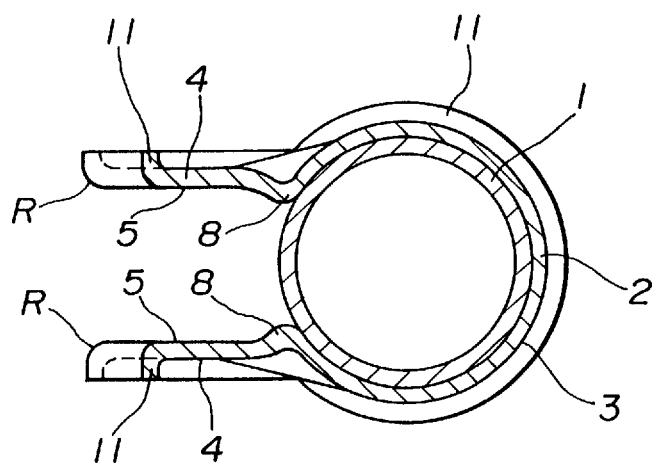
FIG. 16 is a cross-sectional view of the bracket of the fifth embodiment, taken along line XVI—XVI of FIG. 15.
Figure 17:
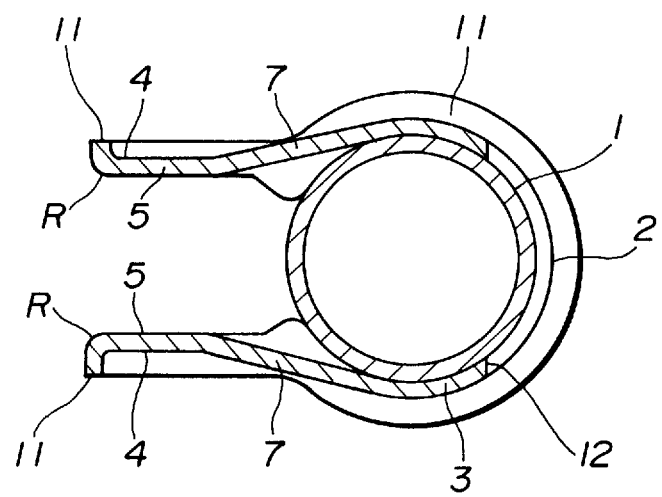
FIG. 17 is a cross-sectional view of the bracket of the fifth embodiment taken along line XVII—XVII of FIG. 15.
Figure 18:
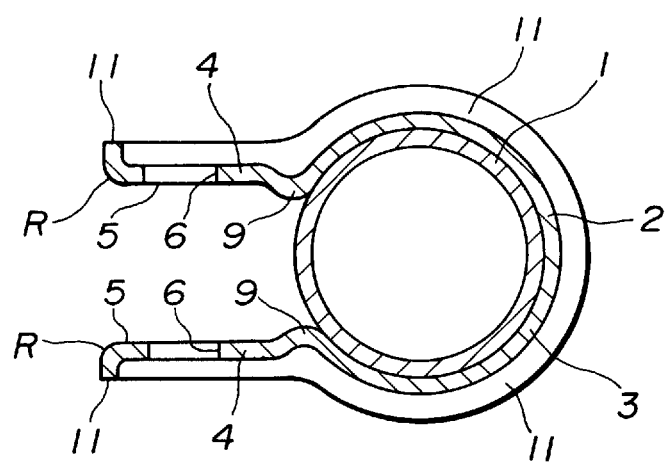
FIG. 18 is a cross-sectional view of the bracket of the fifth embodiment, taken along line XVIII—XVIII of FIG. 15.

Referring to FIGS. 12 and 15, the fixing bracket 2 according to the fourth and fifth embodiments is formed as a single piece U-shaped bracket 2 including a circular body portion 3 having a pair of opposed projecting installation flanges 4, 4. FIGS. 13 and 14, respectively represent cross-sectional views taken along lines XIII—XIII and XIV—XIV of FIG. 12. With respect to the fourth embodiment, it will be noted that a cross-sectional view taken along line B—B of FIG. 12, substantially corresponds to FIG. 9, described in connection with the third embodiment, and offers the same structure and advantages.

The flange portions 4, 4 project substantially perpendicular to a traveling direction of the vehicle. As set forth above, the letters O and I at upper left and right sides of FIGS. 12 and 15 indicate a direction towards outer O and inner I sides of the vehicle wheel in relation to, for example, an annular central area of the vehicle wheel or of a tread portion of an automotive tire.

I may be seen in the drawings that upper and lower lip portions 11, 11 are formed by bending processing, for example, and extend along upper and lower edges of the circular body portion 3 as well as extending along upper and lower edges of the opposed flange portions 4, 4. It will be noted that the configuration of the lip portion is provided in the alternative structures of the fourth and fifth embodiments (compare FIGS. 7, 12, and 15). In other respects, the structure and functioning of the fixing bracket 2 is substantially the same as that of the above-describe third embodiment.

Figure 11:
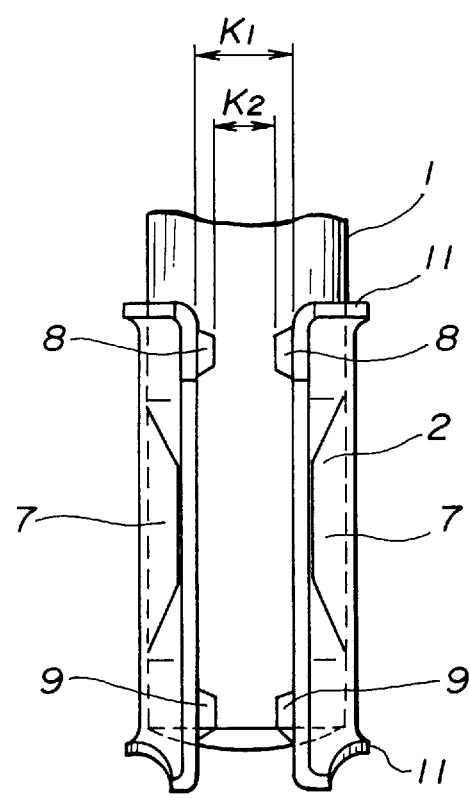
FIG. 11 is a side view showing various relations between a cylindrical automotive pressurized fluid buffer device and the fixing bracket according to the invention and is taken in the direction of the arrow XI of FIG. 7.

In FIG. 11, the fixing bracket 2 is viewed from the direction of the arrow 11 in FIG. 7. The first width K1 of represents a distance between facing edges of the circular body portion 3 while the second width K2 represents a distance between the facing ends of the projected tooth portions. According to the invention, reduction of the distances K1 and K2 is promoted for increasing mechanical support of the outer cylinder 1, of the pressurized fluid buffer device according to the invention.

As best seen by comparing FIGS. 12 and 15, and the cross sectional drawings of FIGS. 16–19 of the fifth embodiment, the configuration of the lip portion 11 of the fifth embodiment is extended to form a peripheral ridge portion R around the entirety of the flange portions 4, 4 as well as upper and lower sides of the circular body portion 3. This promotes improved rigidity and mechanical strength to the structure overall allowing further reduction of weight of the fixing bracket 2.

Further, the third, fourth and fifth embodiments are further distinguished by providing an interval E between a lower side of the upper projected tooth portions 8, 8 and an upper side of the central wedge members 7, 7. According to this, support for the outer cylinder 1 is improved.

In addition, it will be noted that, as seen in FIGS. 7, 12 and 15, the fixing bracket of the third, fourth and fifth embodiments Is formed with a circular bolt seating surface 10, defined coaxially to the upper bolt holes 6 for increasing the mechanical strength of the upper side of the fixing bracket 2 in view of the higher distribution of forces acting on the upper side of the fixing bracket. Referring to FIGS. 12 and 15, it will be noted that an angular relation T established between an upper side of the circular bolt seating surfaces 10 of the upper bolt holes 6, 6 and the proximate lower corner of the lower side of the upper projected tooth portions 8, 8. The angular relation T is determined for further enhancing the wedging effect for increased durability and stability of the bracket 2 of the invention.

In the third to fifth embodiments, as seen in the drawings, the axial length of the upper projected tooth portions 8 is formed larger than the lower projected tooth portions 9, 9 such for increased leverage at the upper side and for allowing a substantially longer weld W to be provided at the lower side of the fixing bracket 2 for providing attachment strength between the fixing bracket 2 and the outer cylinder. Alternatively however, the lower projected tooth portions 9, 9 may be formed the same as the upper tooth portions 8. The increased axial length of the upper tooth portion 8 allows a greater contact surface for increased strength and for the distance K2 (see FIG. 11).

Thus, according to the above-described structure fixing stability is raised and thus preserves cornering stability improving overall vehicle handling, Further, the present structure may be utilized to mounting any of front, rear, left or right pressurized fluid buffer devices.

It will be noted in connection with the above-described fourth and fifth embodiments, that the relations of K1, K2 of the pressurized fluid buffer device and the bracket structure is substantially as described in connection with FIG. 11 of the third embodiment, although the configuration of portions of the fixing bracket 2 vary between these embodiments.

Thus, according to the present invention as described herein above, there is provided a fixing bracket for a pressurized fluid buffer device low in cost, light in weight and simple in structure.

Further, according to the structure of the invention as herein set forth, a fixing bracket is provided by which the above advantages are obtained and in which mechanical strength is increased and installation processing is reduced. Thus, costs are minimized while greater advantages are realized than according to conventional structures.

It will be noted that, although the preferred embodiment is set forth in terms of a fixing bracket for use with a pressurized fluid buffer device such as a vehicle shock absorber, the present invention may be embodied in various different ways without departing from the principle of the invention as herein set forth.

The present invention in not limited only to the description as herein disclosed but may be modified and embodied in other ways without departing from the scope or inventive concept of the invention as set forth above.

What is claimed is:

1. A shock-absorber mounting structure for an automotive vehicle, comprising:

a hydraulic shock absorber having an outer cylinder, the outer cylinder having a lower portion on the peripheral surface thereof; and a fixing bracket comprising:
a body portion partially surrounding the lower portion on the peripheral surface of the outer cylinder except a longitudinal surface portion extending in the longitudinal direction of the hydraulic shock absorber, wherein the body portion has opposed edges defining a gap, which extends in the longitudinal direction of the hydraulic shock absorber, the longitudinal surface portion being exposed at the gap;

a pair of opposed flange portions respectively extending from the opposed edges defining the gap and formed integrally with the body portion, wherein each of the pair of opposed flange portions is formed with upper and lower bolt holes separated by a first distance in the longitudinal direction of the hydraulic shock absorber; and tooth portions on the pair of opposed flange portions, the tooth portions projecting toward each other inwardly across the gap and having contact surfaces that contact the exposed longitudinal surface portion, the tooth portions becoming firmly engaged with the exposed longitudinal surface portion when a bending moment, which tends to widen the gap, occurs between the outer cylinder and the fixing bracket, wherein the body portion has upper and lower edges spaced in the longitudinal direction of the outer cylinder, and wherein the upper bolt holes are spaced farther in the longitudinal direction of the outer cylinder from the upper edge of the body portion than the tooth portions are spaced in the longitudinal direction of the outer cylinder from the upper edge of the body portion.

2. The mounting structure as claimed in claim 1, wherein the tooth portions are in the form of a pair of tooth portions formed on the pair of flange portions, respectively.

3. The mounting structure as claimed in claim 1, wherein the tooth portions include upper and lower pairs of tooth portions, wherein the upper bolt holes are spaced farther in the longitudinal direction of the outer cylinder from the upper edge than the upper pair of tooth portions are spaced in the longitudinal direction of the outer cylinder from the upper edge, and wherein the lower bolt holes are spaced farther in the longitudinal direction of the outer cylinder from the lower edge than the lower pair of tooth portions are spaced in the longitudinal direction of the outer cylinder from the lower edge.

4. The mounting structure as claimed in claim 3, further including central wedge members on the pair of opposed flange portions, the central wedge members being positioned between the upper and lower pairs of tooth portions.

5. The mounting structure as claimed in claim 4, further including a radially outwardly projecting lip portions provided at the upper and lower edges of the body portion, respectively.

6. The mounting structure as claimed in claim 5, wherein the lip portions are provided at the pair of opposed flange portions.

7. The mounting structure as claimed in claim 6, wherein the upper pair of bolt holes are spaced farther in the longitudinal direction of the outer cylinder from the upper edge of the body portion than the lip portion provided at the upper edge of the body portion from the upper edge of the body portion in the longitudinal direction of the outer cylinder.

8. The mounting structure as claimed in claim 6, wherein the lip portions extend over and are provided at the perimeter of the pair of opposed flange portions.

9. The mounting structure as claimed in claim 1, further including a radially outwardly projecting lip portion provided at least at the upper and lower edges of the body portion.

10. A shock-absorber mounting structure for an automotive vehicle, comprising:
 a hydraulic shock absorber having an outer cylinder, the outer cylinder having a lower portion of the peripheral surface thereof; and
 a fixing bracket comprising:
  a body portion partially surrounding the lower portion on the peripheral surface of the outer cylinder except a longitudinal surface portion extending in the longitudinal direction of the hydraulic shock absorber, wherein the body portion has opposed edges defining a gap, which extends in the longitudinal direction of the hydraulic shock absorber, the longitudinal surface portion being exposed at the gap;
  a pair of opposed flange portions respectively extending from the opposed edges defining the gap and formed integrally with the body portion, wherein each of the pair of opposed flange portions is formed with upper and lower bolt holes separated by a first distance in the longitudinal direction of the hydraulic shock absorber; and
  tooth portions on the pair of opposed flange portions, the tooth portions projecting toward each other inwardly across the gap and having contact surfaces that contact the exposed longitudinal surface portion, the tooth portions becoming firmly engaged with the exposed longitudinal surface portion when a bending moment, which tends to widen the gap, occurs between the outer cylinder and the fixing bracket,
  wherein the contact surfaces of each of the toothed portions includes a groove.

11. A fixing bracket for mounting a hydraulic shock absorber for an automotive vehicle, the hydraulic shock absorber including an outer cylinder having a lower portion on the peripheral surface thereof, the fixing bracket comprising:
 a body portion partially surrounding the lower portion on the peripheral surface of the outer cylinder except a longitudinal surface portion extending in the longitudinal direction of the hydraulic shock absorber, wherein the body portion has opposed edges defining a gap, which extends in the longitudinal direction of the hydraulic shock absorber, the longitudinal surface portion being exposed at the gap;
 a pair of opposed flange portions respectively extending from the opposed edges defining the gap and formed integrally with the body portion, wherein each of the pair of opposed flange portions is formed with upper and lower bolt holes separated by a first distance in the longitudinal direction of the hydraulic shock absorber; and
 tooth portions on the pair of opposed flange portions, the tooth portions projecting toward each other inwardly across the gap and having contact surfaces that contact the exposed longitudinal surface portion, the tooth portions becoming firmly engaged with the exposed longitudinal surface portion when a bending moment, which tends to widen the gap, occurs between the outer cylinder and the fixing bracket,
 wherein the body portion has upper and lower edges spaced in the longitudinal direction of the outer cylinder, and
 wherein the upper bolt holes are spaced farther in the longitudinal direction of the outer cylinder from the upper edge of the body portion than the tooth portions are spaced in the longitudinal direction of the outer cylinder from the upper edge of the body portion.

* * * * *